Sept. 23, 1958     O. K. KELLEY     2,852,912
AUTOMOTIVE GAS TURBINE
Filed March 12, 1953     2 Sheets-Sheet 1
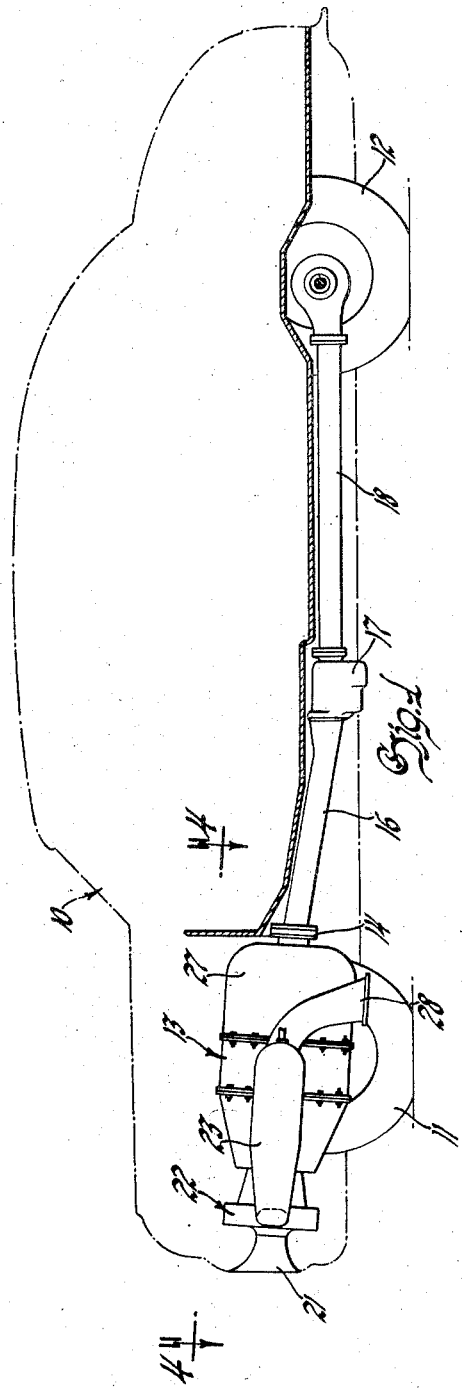
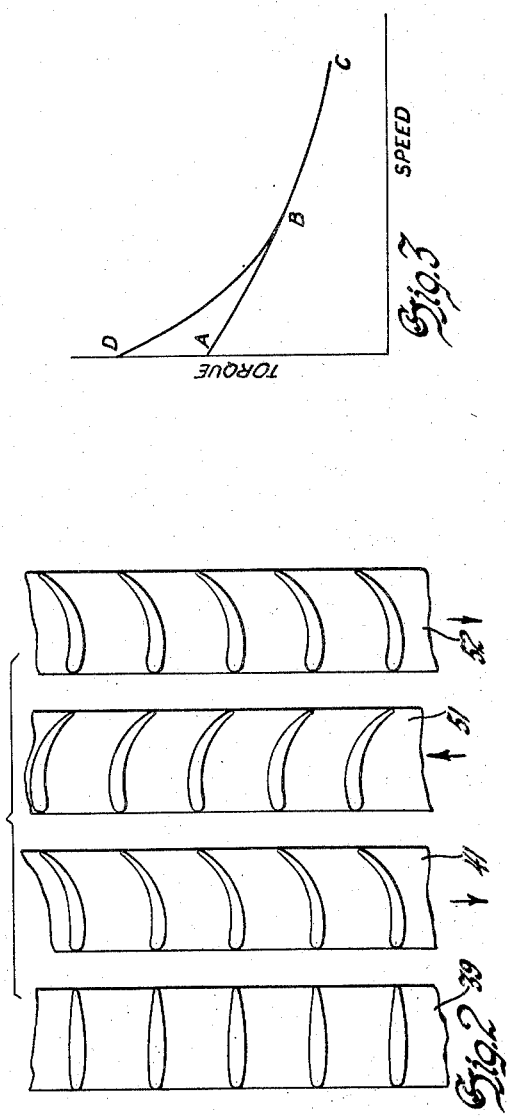
INVENTOR
*Oliver K. Kelley*
BY
*Willito, Helwig & Baillio*
ATTORNEYS Sept. 23, 1958     O. K. KELLEY     2,852,912
AUTOMOTIVE GAS TURBINE Filed March 12, 1953     2 Sheets-Sheet 2

INVENTOR
Oliver K. Kelley
BY
Willits, Helwig & Baillio
ATTORNEYS

United States Patent Office 2,852,912
Patented Sept. 23, 1958

2,852,912

AUTOMOTIVE GAS TURBINE

Oliver K. Kelley, Birmingham, Mich., assignor to General Motors Corporation, Detroit, Mich., a corporation of Delaware Application March 12, 1953, Serial No. 341,915

14 Claims. (Cl. 60—39.16)

My invention is directed to gas turbine power plants and, more particularly, to an automotive gas turbine.

The invention is directed to the combination of a hot gas generator, a gas turbine to convert the energy of the hot gas into mechanical power, and a power transmission device for delivering the power output of the turbine to an automotive drive shaft or the like; the nature of the turbine and the transmission being such, and being so related, that the overall characteristics of the power plant are particularly suited for propulsion of an automotive vehicle or for other installations of similar requirements.

Gas turbine power installations for automotive vehicles have been proposed and discussed, and a few experimental installations have been seen. Such installations have many drawbacks, perhaps the greatest being high fuel consumption. The advantages of such a system are significant, however; among them being the very desirable torque characteristics of a turbine as compared to reciprocating internal combustion engines.

The objects of the present invention are to provide an improved gas turbine power plant and one particularly adapted for traction installations; to provide a combined gas turbine and power transmission device providing both forward and reverse drive and having desirable starting characteristics; and to provide a simple gas turbine power transmission combination particularly suited for automobiles and the like.

The nature of the invention and the advantages thereof will be more clearly apparent from the accompanying drawings and the succeeding detailed description of the preferred embodiment of the invention.

In the drawings:

Fig. 1 is a somewhat schematic view in elevation of an automotive gas turbine installation;

Fig. 2 is a diagram illustrating the blading arrangement of the turbine;

Fig. 3 is a graphic representation of torque characteristics of the power plant.

Figure 4:
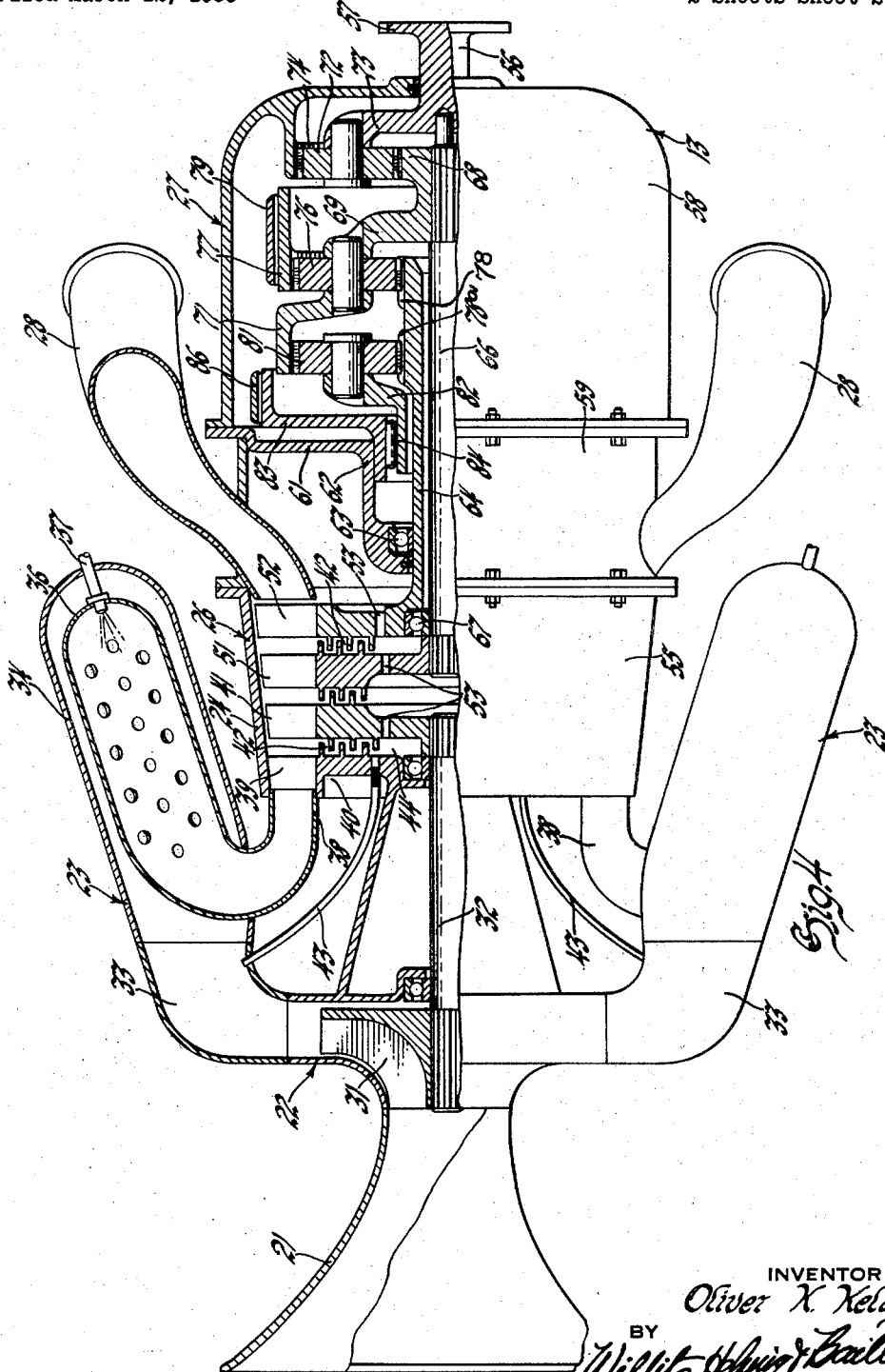
Fig. 4 is a plan view, partly in section along the axis of the turbine, of a power plant according to the invention.

Referring first to Fig. 1, an automobile indicated generally as 10 and having the usual front wheels 11 and rear driving wheels 12 has mounted at the forward end thereof a turbine power plant indicated generally as 13. The power plant may drive through the universal gear 14, a shaft enclosed in a housing 16, a gearbox or transmission 17, and a propeller shaft enclosed in the housing 18 to the rear driving axle. The transmission 17 may or may not be included, but, if included, would be an emergency transmission since no transmission external to the power plant is required in normal operation. As will be seen from Figs. 1 and 4, the power plant 13 comprises the following major components: an air intake 21, a compressor 22, combustion chambers 23, a compressor driving turbine 24, a power output turbine 26, a transmission 27, and exhaust pipes 28.

The compressor 22, combustion chambers 23, and turbine 24 constitute a gas generator of known type which supplies motive fluid in the form of hot combustion products under pressure to the power turbine 26. As will be understood, gas generators of other types may be employed and the invention is not concerned with the type of gas generator or the details thereof, the gas generator shown being merely illustrative of one type. Considering this gas generator somewhat more specifically, air entering through the intake 21 is accelerated by a compressor wheel 31 mounted on the shaft 32, which discharges the air into a diffuser which communicates through diffusing elbows 33 with the two combustion chambers 23. The combustion chamber 23 is illustrated as being of a known reverse flow type comprising an outer shell 34 and a perforated inner casing or flame tube 36 into which fuel is sprayed by a nozzle assembly 37, the fuel being supplied from a suitable source (not shown) under pressure and under control. The compressed air heated by combustion in the flame tubes 36 and mixed with combustion products flows through elbows 38 to a turbine nozzle 39, on a diaphragm 40, which directs the motive fluid to the bladed wheel 41 of the gas generator turbine. Turbine 41 is mounted on shaft 32 which is supported in the fixed frame of the engine on suitable bearings, and thus turbine 41 drives the compressor wheel 31. A cooling arrangement for the turbine wheels and bearings is shown as comprising a tube 43 extending from the compressor outlet through the diaphragm 40 of the turbine nozzle into a space 44 ahead of the turbine wheel 41. A conventional labyrinth seal 42 between the wheel 41 and the diaphragm 40 acts to prevent flow inwardly from the turbine motive fluid path and flow of the cooling air outwardly from the chamber 44.

The motive fluid discharged from the gas generator, that is, from the turbine wheel 41, drives turbine 26 comprising counter-rotating turbine wheels 51 and 52 in that order, the motive fluid discharged from the wheel 52 at reduced temperature and pressure being discharged through the exhaust pipes 28. Conventional labyrinth seals 42 are provided between the turbine wheels 41 and 51, and 51 and 52, respectively. The cooling air introduced through chamber 44 flows through holes 53 in the several turbine wheels and is ultimately discharged downstream of the turbine wheel 52. The relatively cool air flowing adjacent the turbine wheel hubs reduces transmission of heat to the shaft bearings.

The nature of the blading of the turbine will be more clearly apparent from the diagrammatic representation of Fig. 2 in which a typical blading arrangement is illustrated as the blades would appear looking toward the axis of the turbine. The fixed nozzle 39 directs the gas onto the gas generator turbine 41 from which it flows through turbines or turbine wheels 51 and 52. It will be noted that the disposition of the blades on the wheels 41, 51, and 52 is such that wheels 41 and 52 tend to rotate from top to bottom of Fig. 2, which is backward with respect to the rotation of the output shaft 56 when the car is moving forward. This is clockwise as viewed from the front of the vehicle and wheel 51 tends to rotate counterclockwise. Thus, wheels 51 and 52 are normally counter-rotating, although in reverse drive they are held together and rotate in the same direction, as will be explained.

All of the turbine wheels and the nozzle vanes 39 are mounted within a casing 55 although it will be understood, of course, that the power turbine may be structurally independent of the gas generator whether or not the generator includes a turbine wheel. The closely adjacent series relation of the compressor turbine and power turbine is desirable, however, for compactness and to reduce the number of parts, since the compressor drive turbine wheel 41 may discharge the motive fluid directly to the wheel 51 without requiring a stationary nozzle ahead of the wheel 51, particularly since the wheels 41 and 51 preferably rotate in opposite directions.

As will be apparent, therefore, all ahead of wheel 51 in the motive fluid path may be regarded simply as means for generating the motive fluid and everything downstream of the wheel 41 may be regarded as means for transforming the energy of the motive fluid into mechanical work. These latter means comprise primarily the counter-rotating wheels 51 and 52 with the gearing by which they are coupled to the power output shaft 56, illustrated in Fig. 4 as including a flange 57 for coupling to a propeller shaft or the like in the vehicle. The power transmission mechanism 27 is mounted within a gear case 58 provided with a flange by which it is bolted to a turbine exhaust casing 59 which is similarly bolted to the turbine casing 55. The exhaust pipes 28 extend outwardly through the exhaust casing 59. A web 61 within the casing 59 is integral with a cylindrical bearing support 62 within which is mounted a bearing 63 for the hollow shaft 64 of the second turbine wheel 52. The first turbine wheel 51 is mounted on a shaft 66 supported within the shaft 64 by bearing 67. Both shafts extend into the gear case 58, the first turbine shaft 66 having mounted on the rear end thereof an assembly comprising a sun 68 of a rear planetary gearset, a planet carrier 69 of a central planetary gearset, and a ring gear 71. The sun 68 meshes with planet gears 72 mounted on a rear carrier 73 integral with the power output shaft 56. The planet gears 72 also mesh with a rear reaction ring gear 74 fixed in the casing 58. As will be apparent, sun 68, planet gears 72, and ring gear 74 constitute the rear epicyclic reduction gear by which the output shaft 56 is driven from the first turbine shaft 66 at reduced speed. Such a reduction gear is desirable in many cases because of the high rotational speeds of turbines and would ordinarily be needed in an automotive installation to avoid excessive speed of the propeller shaft and excessive reduction ratios in the rear axle.

The central planet carrier 69 mounts a number of planet gears 76 which mesh with a central reaction ring gear 77 rotatably mounted in the casing and with a second turbine input sun gear 78 at the rear end of the hollow second turbine shaft 64. The ring gear 77 may be held against rotation by a brake band 79 which may be applied by any suitable mechanism (not shown). The band 79 is normally released, but is applied for reverse rotation of the output shaft 56.

The second turbine input sun gear 78a, which may be identical with the sun gear 78, engages planet gears 81 on a planet carrier 82, these planet gears also meshing with the front reaction ring gear 71 fixed to the first turbine shaft. The planet carrier 82 is formed with a hub which is supported in the hollow hub of a brake drum 83 and coupled to the drum by a one way clutch 84 of the conventional roller type or the like, so that when the brake drum 83 is stationary the planet carrier 82 is held against rotation in the same direction as the hollow shaft 64 but may rotate freely in the opposite direction, that is, in the same direction as shaft 66. Brake drum 83 is rotatably mounted within the bearing housing 62 and is normally (that is, in forward operation of shaft 66) held against rotation by a brake band 86 applied by any suitable mechanism (not shown).

*Operation*

Considering now the operation of the device, the gas generator, as will be understood, receives air through the air intake 21, compresses it in the compressor 22, burns fuel in the air to heat it in the combustion chambers 23, and takes part of the energy of the hot combustion products to operate the turbine wheel 41 which drives the compressor wheel 31. The temperature, pressure, and rate of flow of the combustion products from the gas generator may be varied in any manner suitable to the particular type of generator employed, as, for example, by varying the fuel rate, to vary the amount of energy available to the power turbine wheels 51 and 52.

Turbine wheel 51 is urged in the counterclockwise direction as viewed from the intake of the engine by the combustion products. The turbine wheel is directly and constantly coupled to the output shaft 56 through shaft 66 and gears 68, 72, and 74 so that it always tends to drive the output shaft in the forward direction. The second turbine wheel 52 is urged to rotate in the clockwise direction as viewed from the air inlet end of the engine, and this wheel may be coupled to the output shaft so as to urge it in either the forward or reverse direction.

The turbine wheel 51 is the principal turbine in the sense that it develops more power than the turbine wheel 52 under usual operation conditions and is the one relied on for propulsion of the vehicle at cruising speeds. The turbine wheel 52 serves to develop power in the lower speed range to improve low speed pulling and acceleration and serves also to drive the vehicle in reverse. The actual torque and power outputs developed by the two turbine wheels will depend in the first instance on the power input to the power turbine 26 as a whole and the relative outputs of the two wheels will vary with their speed and relative rotation. It will be assumed that the stall torque of the second turbine 52 is considerably less than that of the first turbine 51.

*Forward drive*

For forward operation, the brake band 86 holds the brake drum 83 against rotation and the brake band 79 is released so that the ring gear 77 can rotate freely. With the ring gear 77 free to rotate, no power is transmitted from the second turbine wheel through the shaft 64 and intermediate planetary gearset. However, torque can be transmitted from the second turbine 52 to drive the output shaft 56 forward through the front gearset. The front ring gear 71 is turning forward, that is into the plane of the paper in Fig. 4 and away from the eye of the observer at the speed of the first turbine 51. The sun gear 78 turns backward at the speed of the second turbine 52. The carrier 82 is permitted to turn forward but is prevented from turning backward by the over-running clutch 84. Whenever the backward speed of the second turbine, multiplied by the ratio of the front gearset 78a—81—71 is greater than the forward speed of the first turbine 51, the front carrier 82 tends to rotate backward, that is out of the plane of the paper in Fig. 4 and toward the eye of the observer. It is then locked by the over-running clutch 84 and becomes the reaction point of the front planetary gearset, so that the planet gears 81 reverse the torque between the front sun gear 78a and front ring gear 71 and the rear turbine 52 drives the front ring gear 71 forward. Ring gear 71 is thus urged to rotate in the same direction as shaft 66 and the torques of the turbines add to drive the vehicle forward. As will be apparent, as long as the front planet carrier 82 remains stationary, the two turbine wheels are, in effect, geared together with turbine wheel 52 driving the output shaft at a reduced speed ratio so that it turns faster than wheel 51 which drives the output shaft direct. Assuming, for purpose of example, that the gear ratio is two to one, the speed of turbine wheel 52 is two times that of 51 and two times the torque developed by wheel 52 is applied to the output shaft from the wheel 52.

With the power turbine at standstill, the tangential component of velocity of the gas entering the second turbine 52 wheel is a maximum and, likewise, the relative tangential velocity (for any given gas flow input to the power turbine).

When the torque exerted by the turbine accelerates the vehicle from standstill, the second turbine wheel will turn at a ratio of two turns to one with respect to the first turbine wheel. Both the absolute and relative tangential velocities of the gas entering the second turbine wheel will decrease as the relative speed of the two wheels increases and, therefore, the torque developed by the second wheel will rapidly decrease. The torque developed by the first turbine wheel will also tend to decrease as its speed increases, but the slope of the torque characteristic of the first turbine wheel relative to output shaft speed is much less than that of the second turbine wheel.

Ultimately, the relative tangential velocity of the gas entering the second turbine wheel becomes such that the torque developed by the second turbine wheel decreases to zero and would reverse with further increase in speed of the turbine wheels. At this point, which may be called the zero torque point of the torque characteristic of the second turbine wheel, the one way brake 84 permits the planet carrier 82 to rotate so that there is no longer direct drive connection between the second turbine and the output shaft. The second turbine may continue to free-wheel at whatever speed is dictated by the gas entering the wheel, and the first turbine wheel furnishes the entire torque for driving the load. It will be apparent that the arrangement including the one-way brake in the epicyclic gear train between the second turbine and the output shaft constitutes an overrunning clutch in the gearing such that the first turbine may overrun the second turbine. The effect of the second turbine wheel in starting the vehicle and in operation at low speeds will, presumably, be apparent from the foregoing but may be more clearly apparent from Fig. 3 in which the curve A—B—C represents the characteristic of torque delivered at the output shaft against the speed of the output shaft for the first turbine alone. The torque gradually decreases from the stall point value as the speed increases. The curve D—B can be taken as representing the total output of the two turbine wheels, the ordinates between the lines A—B and D—B representing the torque at the output shaft contributed by the second turbine wheel. The second turbine wheel contributes substantially to the torque at standstill and at low speeds, but upon reaching the point B at which its torque becomes zero and the second turbine wheel runs idle, the entire load is carried by the first turbine wheel as indicated by the line B—C. As will be apparent, the actual characteristics of the power plant may vary widely, depending upon the characteristics of the individual wheels which determine the torque output of these wheels, and upon the ratio of the gearing between the wheels. For given wheels, the greater the reduction ratio between the second wheel and the first, the greater the torque contribution of the second wheel at stall will be but the lower the speed at which the second turbine will run idle. Thus, by provision of the two turbines and the overrunning connection it is possible to obtain a different type of torque speed characteristic for the power plant than would be possible with a single turbine wheel or with two turbine wheels constantly geared together, in that for a given torque output in the normal driving range of an automobile, for example, a greater torque for acceleration at low speeds or for hard pulling on steep hills or the like is available. The advantages of this for an automobile and for other installations of a traction type in which a high torque at low speeds is desired will be clear.

Reverse drive

To operate the output shaft 56 and, therefore, the vehicle in the reverse direction, the second turbine wheel 52 is coupled to the output shaft so that it tends to drive the output shaft in the same direction as the rotation of this wheel. In his case, therefore, both wheels 51 and 52 turn in the same direction, the direction of rotation of the first wheel 51 being abnormal. The wheels are coupled together through a reduction gearing so that the second wheel turns much faster than the first wheel and its effective torque delivered to the output is greater. To change from forward to reverse operation, it is necessary only to release the forward band 86 and apply the reverse band 79. Releasing the band 86 permits the pinion carrier 82 to rotate freely in both directions so that no power is transmitted from the second turbine wheel to the output shaft through the ring gear 71. With the reverse band 79 holding the rear ring gear 77, the second turbine wheel drives intermediate carrier 69 backward at the reduced ratio of the intermediate gearset 79—76—78 and so exerts multiplied reverse torque on the rear sun gear 68. The sun gear 68 is thus urged backward by the torque of second turbine 52 multiplied by the ratio of the intermediate gearset, and forward by the torque of the first turbine 51, which is not multiplied. Since the torque of the second turbine multiplied by its gearset is greater than the torque of the first turbine at stall and low speeds, the reverse torque prevails and the car is driven backward, forcing the second turbine backward. Noting that in this case the output shaft and both turbine wheels turn in the same direction and assuming that the reduction ratio of the center gearset 79—76—78 is, say five to one, as the car accelerates backward from standstill, both wheels 51 and 52 turn clockwise as viewed from the forward end of the vehicle, with wheel 52 turning at five times the speed of wheel 51.

Because of the relatively high reduction ratio between the second turbine wheel and the output shaft, the speed of this turbine increases rapidly with the speed of the output shaft and, therefore, its torque falls off rapidly. Therefore, at some point in the lower speed range of the vehicle the torques delivered to the output shaft by the two turbine wheels would balance, providing an effective limit on the speed of reverse operation. However, due to the favorable gear ratio of the second turbine wheel, an adequate reverse torque at low speed is available. The gear ratios may be such as to provide the same or greater torque in reverse as in forward drive.

The turbine may be braked, if desired, by applying both of the brake bands 79 and 86. This might be desirable in some cases as, for instance, in shifting an auxiliary transmission.

The one-way clutch or over-running clutch 84 is an example of any suitable unidirectional torque establishing device which permits one part, in this case carrier 82, to rotate in one sense with respect to another part, in this case the brake drum 83, but prevents rotation of the one part with respect to the other part in the opposite sense.

Those versed in the art of power transmission gearing will realize that the gear arrangement indicated generally as 27 is a somewhat schematic showing of one type of gearing adaptable to the requirements of the invention. Design details of the gearing are omitted for clarity and simplicity of the drawings, since such are well known to those skilled in the art.

Likewise, details of the turbine and gas generator are omitted, since the invention is not concerned with the details of structure of these elements of the invention, which may be constructed according to known engineering practices.

The general arrangement of the power turbines and gearing illustrated herein is considered to be quite a desirable one from the standpoint of simplicity, compactness, and economy. It will be apparent to those skilled in the art that the desirable torque characteristics and simple control of the power turbine transmission combination described herein are particularly advantageous for automotive and other traction installations.

The detailed description herein of the preferred embodiment of the invention for the purpose of explaining the principles thereof is not to be regarded as limiting or restricting the invention, since many modifications may be made therein by the exercise of skill in the art.

I claim:

1. A gas turbine power plant adapted for vehicle propulsion comprising a gas generator, first and second turbine wheels energized by the gas generator, means coupling the first turbine wheel to a power output shaft for normal drive of the output shaft in the forward direction, means for providing a driving connection from the second turbine wheel to the power output shaft at will to drive the output shaft in the forward direction, and means operable at will for coupling the second turbine wheel to the power output shaft in opposition to the first turbine wheel to drive the output shaft in the reverse direction, the last-named means being of such ratio that the effective torque of the second turbine wheel exceeds that of the first turbine wheel.

2. A gas turbine power plant adapted for vehicle propulsion comprising a gas generator, first and second counter-rotating turbine wheels energized by the gas generator, means coupling the first turbine wheel to a power output shaft for normal drive of the output shaft in the forward direction, means including an overrunning clutch for providing a driving connection from the second turbine wheel to the power output shaft at will to drive the output shaft in the forward direction, and means operable at will for coupling the second turbine wheel to the power output shaft in opposition to the first turbine wheel to drive the output shaft in the reverse direction.

3. A gas turbine comprising, in combination, a first turbine wheel, a second counter-rotating turbine wheel receiving the discharge from the first turbine wheel, a hollow shaft for the second turbine wheel, a shaft for the first turbine wheel within the hollow shaft, a first planet carrier and a first ring gear mounted on the first turbine wheel shaft for rotation therewith, a first planet gear on the first planet carrier, a second ring gear meshing therewith, a brake for the second ring gear, a sun gear on the hollow shaft meshing with the first planet gear, a second planet carrier, a second planet gear thereon meshing with the first ring gear and with said sun gear, unidirectional torque-establishing means preventing rotation of the second planet carrier in the same direction as the second turbine wheel, and means for disabling the unidirectional means.

4. A gas turbine comprising, in combination, a first turbine wheel, a second counter-rotating turbine wheel receiving the discharge from the first turbine wheel, a hollow shaft for the second turbine wheel, a shaft for the first turbine wheel within the hollow shaft, a ring gear mounted on the first turbine wheel shaft for rotation therewith, a sun gear on the hollow shaft, a planet carrier, a planet gear thereon meshing with the ring gear and with the sun gear, unidirectional torque-establishing means preventing rotation of the planet carrier in the same direction as the second turbine wheel, and means for disabling the unidirectional means.

5. A power plant comprising, in combination, a gas generator for generating a stream of gas under pressure, a first turbine wheel, means for directing the stream onto the first turbine wheel to rotate it in one direction, a second turbine wheel disposed to receive directly the discharge from the first turbine wheel to rotate it in the opposite direction, so that the first turbine wheel serves as a nozzle for the second turbine wheel and the tangential component of velocity of the motive fluid entering the second turbine wheel decreases as the rotational speed of the first turbine wheel accelerates from standstill, a power output shaft, and means for providing driving connections from the two turbine wheels to the output shaft alternatively in adding torque relation and in opposing torque relation.

6. A power plant comprising, in combination, a gas generator for generating gas under pressure, a first turbine, means for directing the gas onto the first turbine wheel to urge it in one direction, a second turbine disposed to receive the gas so as to urge it in the opposite direction, a power output shaft, means for connecting the two turbines to the output shaft in torque adding relation with the second turbine geared down relatively to the first turbine, the said connecting means including means for effectively disconnecting the second turbine upon reversal of torque therefrom resulting from increase in speed of the turbines, and second connecting means for connecting the two turbines to the output shaft in opposing torque relation with the second turbine geared down relatively to the first turbine sufficiently so that within a range of turbine speeds from standstill the effective torque at the output shaft of the second turbine exceeds that of the first turbine so that the output shaft is driven in reverse direcion.

7. A power plant comprising, in combination, a gas generator for generating a stream of gas under pressure, a first turbine wheel, means for directing the stream onto the first turbine wheel to rotate it in one direction, a second turbine wheel disposed to receive directly the discharge from the first turbine wheel to rotate it in the opposite direction, so that the first turbine wheel serves as a nozzle for the second turbine wheel and the tangential component of velocity of the motive fluid entering the second turbine wheel decreases as the rotational speed of the first turbine wheel accelerates from standstill, a power output shaft, means for connecting the two turbine wheels to the output shaft in adding torque relation, the said connecting means including means for effectively disconnecting the second turbine wheel upon reversal of torque therefrom resulting from increase in speed of the turbine wheels, and second connecting means for connecting the two turbine wheels to the output shaft in opposing torque relation so that within a range of turbine speeds from standstill the effective torque at the output shaft of the second turbine wheel exceeds that of the first turbine wheel so that the output shaft is driven in reverse direction.

8. A power plant comprising, in combination, a gas generator for generating a stream of gas under pressure, a first turbine wheel, means for directing the stream onto the first turbine wheel to rotate it in one direction, a second turbine wheel disposed to receive directly the discharge from the first turbine wheel to rotate it in the opposite direction, so that the first turbine wheel serves as a nozzle for the second turbine wheel and the tangential component of velocity of the motive fluid entering the second turbine wheel decreases as the rotational speed of the first turbine wheel accelerates from standstill, a power output shaft, means for connecting the two turbine wheels to the output shaft in adding torque relation with the second turbine wheel geared down relatively to the first turbine wheel, the said connecting means including means for effectively disconnecting the second turbine wheel upon reversal of torque therefrom resulting from increase in speed of the turbine wheels, and second connecting means for connecting the two turbine wheels to the output shaft in opposing torque relation with the second turbine wheel geared down relatively to the first turbine wheel sufficiently so that within a range of turbine speeds from standstill the effective torque at the output shaft of the second turbine wheel exceeds that of the first turbine wheel so that the output shaft is driven in reverse direction.

9. A power plant comprising, in combination, a gas generator, a first turbine powered by the gas generator, a power output shaft, means coupling the first turbine to the shaft, a second turbine powered by the gas generator, and gearing providing a driving connection from the second turbine to the shaft shiftable to connect the second turbine to aid the first turbine for forward operation of the shaft and to connect the second turbine to override the first turbine for reverse operation of the shaft.

10. In a power plant, in combination, a gas generator, first and second turbine wheels powered by the gas generator, a power output shaft, and power transmission means coupling the said turbine wheels to the said shaft, the said power transmission means comprising first gearing constantly providing a driving connection from the first turbine wheel to the shaft, second gearing providing a driving connection from the second turbine wheel to the shaft in aiding relation to the first turbine wheel for forward operation of the shaft, the second gearing including an overrunning device, and third gearing connecting the second turbine wheel to the shaft in opposing relation to the first turbine wheel for reverse operation of the shaft.

11. A power plant comprising, in combination, a gas generator, a first turbine powered by the gas generator, a power output shaft, means connecting the first turbine to the output shaft at such speed ratio that the zero torque point of the turbine is above the normal speed range of the output shaft, a second turbine powered by the gas generator, gearing engageable for connecting the second turbine to the output shaft of such ratio that the zero torque point of the second turbine is within the normal speed range of the output shaft, the said gearing between the second turbine and the output shaft including an overrunning connection, and gearing engageable for connecting the second turbine to the output shaft of such ratio that the effective torque of the second turbine is greater than and opposed to the effective torque of the first turbine.

12. A power plant comprising in combination a first turbine, a second and counter-rotating turbine, means for circulating torque transmitting fluid successively through the turbines, a hollow shaft secured to the second turbine, a shaft secured to the first turbine within the hollow shaft, a first planet carrier and a first ring gear secured to the first turbine shaft, a first planet gear journaled on the first planet carrier, a second ring gear meshing with the first planet gear, means for holding the second ring gear against rotation, a first sun gear secured to the hollow shaft and meshing with the first planet gear, a second planet carrier, a second planet gear journaled on the second planet carrier and meshing with the first ring gear, a second sun gear secured to the hollow shaft meshing with the second planet gear, unidirectional torque transmitting means preventing rotation of the second planet carrier in the sense of rotation of the second turbine and means for disabling the torque-establishing means to permit free rotation of the second planet carrier.

13. A power plant comprising in combination a first turbine, a second and counter-rotating turbine, means for circulating torque transmitting fluid successively through the turbines, a hollow shaft secured to the second turbine, a shaft secured to the first turbine within the hollow shaft, a ring gear secured to the first turbine shaft, a sun gear secured to the hollow shaft, a planet carrier, a planet gear journaled on the planet carrier and meshing with the ring gear and with the sun gear, uni-directional torque-establishing means preventing rotation of the planet carrier in the same sense of rotation as the second turbine and means for disabling the uni-directional torque establishing means to permit free rotation of the carrier.

14. In a power plant in combination a gas generator, first and second turbines powered by the gas generator, an output shaft, and power transmitting means connecting the turbines in driving relation to the output shaft, said power transmitting means including means constantly connecting the first turbine in driving relation to the output shaft, gearing connecting the second turbine in driving relation to the output shaft to assist the first turbine in driving the output shaft forward, the gearing including an overrunning device, and second gearing connecting the second turbine in driving relation to the shaft to oppose the torque of the first turbine to drive the output shaft backward.

References Cited in the file of this patent

UNITED STATES PATENTS

| | | |
|---|---|---|
| 2,203,177 | Patterson | June 4, 1940 |
| 2,550,082 | Orr | Apr. 24, 1951 |
| 2,554,593 | Sedille | May 29, 1951 |
| 2,619,797 | Haworth | Dec. 2, 1952 |
| 2,631,427 | Rainbow | Mar. 17, 1953 |
| 2,660,033 | Bowden et al. | Nov. 24, 1953 |

FOREIGN PATENTS

| | | |
|---|---|---|
| 666,092 | Great Britain | Feb. 6, 1952 |